Patented Jan. 9, 1951

2,537,726

UNITED STATES PATENT OFFICE 2,537,726

POLYHYDRIC ALCOHOLS

Harold Wittcoff and John Robert Roach, Minneapolis, Minn., assignors to General Mills, Inc., a corporation of Delaware No Drawing. Application October 24, 1946, Serial No. 705,489

14 Claims. (Cl. 260—333)

The present invention relates to non-distillable polyhydric alcohols or amino alcohols of relatively high molecular weight resulting from the condensation of polyfunctional alkylating reagents with polyhydroxy compounds, potential polyhydroxy compounds or amino hydroxyl compounds, and to the method of producing these materials.

For many purposes, polyhydric alcohols and amino alcohols having a high degree of functionality are desirable; for example, in the protective coating field, polyhydric alcohols esterified with unsaturated fatty acid groups are used in coatings because of their drying characteristics. The rate of drying of these compounds is dependent upon the degree of unsaturation and consequently upon the number of unsaturated fatty acid groups in the molecule. Accordingly, there have been attempts to produce polyhydric alcohols of increased functionality, such that they may be used for esterification with unsaturated fatty acids to produce drying compositions. Thus synthetic compounds such as pentaerythritol, 2,2,6,6 - tetramethylolcyclohexanol, 3,3,5,5-tetramethylolpyran-4-ol, have been made containing four to five hydroxyl groups per molecule. Other attempts to make use of polyhydric alcohols have involved the use of sugars and sugar alcohols. These, however, have not proved satisfactory because they demonstrate heat instability during subsequent esterification.

Moreover, the polyhydric alcohols or amino-containing polyhydric alcohols produced according to the present invention possess cross-linkages within the molecule. In this respect, they differ from known polyhydric alcohols, some of which may have branched chains, but none of which possess cross-linking. This cross-linkage property has long been sought after in polyhydric alcohols. It is particularly valuable in those instances in which the polyhydric alcohol is to be converted into derivatives which are subjected to polymerization, such as unsaturated ethers, esters, or amides of drying or semi-drying oil acids. Thus, for example, unsaturated ethers of these cross-linked alcohols possess phenomenally rapid gel characteristics which are attributed to cross-linkages in the alcohol part of the molecule. This same valuable characteristic is observed in derivatives useful as protective coating intermediates such as drying oil or semi-drying oil esters which possess a very rapid drying time because of the basic cross-linking in the molecule. This, together with the cross-linking which occurs in the process of polymerization, serves to yield a film which is highly superior.

It is, therefore, an object of the present invention to provide novel polyhydric alcohols or amino-containing polyhydric alcohols by the condensation of a polyfunctional etherification agent and a polyhydroxy compound or an amino hydroxy compound, which product is characterized by cross-linkages.

It is a further object of the invention to provide a process of producing such materials.

In general, the invention involves the condensation of a polyfunctional alkylating reagent with a polyhydroxy compound or with an amino hydroxy compound, containing free or potential hydroxy groups.

Considerable variation is possible in the polyhydroxy compound or amino hydroxy compound employed as well as in the polyfunctional alkylating agent. Suitable polyhydroxy compounds or derivatives thereof, or amino hydroxy compounds, include ethylene glycol, propylene glycol, butylene glycol, glycerol, diglycerol, triglycerol, higher polyglycerols, pentaerythritol, dipentaerythritol, higher polypentaerythritols, 2,2,6,6-tetramethylolcyclohexanol, 3,3,5,5-tetramethylol-pyran-4-ol, 3,3,5 - trimethylol - 5 - methylpyran - 4-ol, 3,5-dimethylol - 3,5 - dimethylpyran - 4-ol, erythritol, erythrose, xylitol, xylose, sorbitol, mannitol, glucose, sucrose, ethanolamine, diethanolamine, triethanolamine, tris - (hydroxymethyl) - aminomethane, and the like, and any ester, ether, or amide of the above types of compounds. In addition, there may be employed such compounds as glycerol monochlorohydrin, glycerol dichlorohydrin, mono- or dichlorohydrins of diglycerol, triglycerol, tetraglycerol, etc., as disclosed in our co-pending application, Serial No. 705,485, entitled Halohydroxypropyl Ethers, filed of even date herewith, monoallylglycerol, monoallyldiglycerol, which may be obtained as a by-product in the preparation of monoallylglycerol, monoallyldiglycerolmonochlorohydrin, which may be obtained by the addition of one mole of hypochlorous acid to diallyl glycerol, glycidol, glycerolglycidol, diglycerolglycidol, pentaerythritol mono- or dihalohydrin, and chloro - derivatives of 2,2,6,6 - tetramethylolcyclohexanol or 3,3,5,5-tetramethylolpyran - 4 - ol, epichlorohydrin, the diepoxide of diallyl ether, the diepoxide of diallylglycerol, and the like. It will be noted that there are included compounds such as glycerol dichlorohydrin and epichlorohydrin which contain only one hydroxyl group. However, under the conditions of the reaction, once the alkylation process starts, some of the halogen atoms are replaced by hydroxyl groups, making it, in effect, a polyhydroxy compound. The term polyhydroxy compound used herein and in the claims is intended to include those compounds which possess free hydroxyl groups as well as those which possess potential hydroxyl groups which become available during the etherification process.

It is to be noted that the polyhydroxy compounds and the amino hydroxy compounds herein disclosed are of relatively low molecular weight as compared with higher polymeric polyhydroxy compounds, such as starch, cellulose and the like, which would not be suitable for the instant purpose as they form products which are insoluble, etc.

Suitable polyfunctional alkylating reagents include glycerol dihalohydrins (chloro, bromo, iodo), epihalohydrin, diglyceroldihalohydrin, triglyceroldihalohydrin, the diepoxide of diallyl ether, the diepoxide of diallyl glycerol, tetraglyceroldihalohydrin, and similar reagents which serve not only to introduce cross-linking, but which at the same time, introduce additional hydroxyl groups into the molecule, thus serving the very valuable purpose of increasing the hydroxyl functionality. Many of these alkylating agents may be made in accordance with the teachings of the above referred to halohydroxypropyl ethers case. Thus glyceroldihalohydrin may be made by a hypohalous acid addition to diallyl ether; triglyceroldihalohydrin, by the hypohalous acid addition to diallylglycerol; the diepoxide of diallyl ether and the diepoxide of diallylglycerol by treatment of the corresponding halohydrin with strong alkali; tetraglyceroltrihalohydrin by the hypohalous acid addition to triallylglycerol. Still other compounds which have been found valuable as polyfunctional alkylating reagents include 1,4-dichlorobutene-2, 1,2-dichlorobutene-3, any of the dichloropropylenes, and similar compounds. These reagents introduce not only cross-linking but also carbon-to-carbon unsaturation which imparts valuable properties to the polyhydric alcohol, especially if it is to be converted to derivatives which are to be polymerized. Still other reagents which have been found valuable as di- or higher polyfunctional alkylating reagents include 2-chloroethyl ether, ethylene dichloride, ethylene dibromide, 1,2,3-trichloropropane, the bis-(chloromethyl)-benzenes, 2,4-dichloronitrobenzene, and in fact any compound containing two or more halogen atoms which are fairly reactive.

It will be apparent that some of these alkylating agents are only bifunctional as are some of the polyhydroxy compounds and amino hydroxy compounds. In order to obtain cross-linkages, it is necessary that at least one of the reactants have a higher functionality than two. This functionality in the case of the polyhydroxy compounds and amino hydroxy compounds may be in the form of hydroxyl groups or amino groups. In the case of the alkylating agent, there must be at least two alkylating groups which may be in the form of halogen, epoxide groups, and the like. In addition, the alkylating agent may contain groups such as amino or hydroxyl groups which may be alkylated. Thus for the present reaction, it is only necessary that the alkylating agent contain at least two alkylating groups and that the total number of groups capable of entering into the reaction be at least 5. Thus the reactants, ethylene glycol and glycerol dichlorohydrin, have the requisite functionality.

The reaction proceeds readily and in a very simple manner. While any of the conventional etherifying procedures may be followed, it is preferred to employ as the condensing medium a solution of a concentrated caustic alkali such as a 50% aqueous sodium hydroxide solution, although more dilute solutions may be used. The polyhydroxy compound or amino hydroxy compound may be mixed with the requisite amount of caustic alkali solution, usually a 0.1 molar excess based on the amount of alkylating reagent. Thereafter, the alkylating reagent may be added all at once or slowly over a period of several hours with agitation and heating. Then the precipitated inorganic material is removed by filtration and the filtrate is neutralized and concentrated under reduced pressure. From the residue the desired product may be obtained by extracting with an alcohol such as methanol, ethanol, propanol, and 2-propanol. If desired, volatile material such as glycerol may be removed by distillation under vacuum.

Where epoxides are used as the alkylating reagent, the reaction proceeds much more rapidly and it is usually necessary to use only a catalytic amount of either alkali, acid, or acid salts as the condensing agent. In some instances it may be necessary to cool the reaction. On the other hand, where less reactive halogen derivatives are used, such as 2-chloroethyl ether, it may be advisable to employ more severe conditions such as those obtainable with an autoclave.

Considerable variation is possible with respect to time and temperature. Thus the reaction time may extend from one to twelve or more hours, whereas the temperature may vary from room temperature in the case of epoxides, to 150° C. or more in the case of halides.

When polyhydric alcohols are used which are condensation products of carbonyl-containing compounds or the like with formaldehyde or its homologues, it is not necessary to isolate these in order to carry out the further condensations herein described. Thus pentaerythritol, for example, may be prepared according to the usual procedure in aqueous medium from acetaldehyde and formaldehyde in the presence of alkali. Ordinarily a tedious isolation procedure follows. For the purpose of the present invention, however, this is unnecessary. Solid alkali or very concentrated caustic solution may be added directly to the reaction mixture after which this mixture is treated with the alkylating agent as previously described. This effects a substantial saving in the economics of the process.

As has been indicated above, these cross-linked polyhydric alcohols or amino alcohols are particularly valuable in the formation of unsaturated ethers, esters, and amides which are subsequently to be polymerized. They also find valuable application in many other fields and in many applications they have the added advantage over glycerol and other polyhydric alcohols similar to glycerol, in that they possess a much greater viscosity. Additional uses for these products are as follows: They have been found to be valuable in the preparation of protective coating intermediates. Thus esters and amides formed with drying or semi-drying oil acids are valuable reconstituted oils. Esterification with rosin, hydrogenated rosin, limed or zincated rosin, disproportionated rosin, rosin-maleic anhydride adduct, Manila copal, or any similar resin or resin derivative yields valuable materials for use in varnish manufacture. These polyhydric alcohols of the present invention may likewise be used for the formation of modified alkyd resins.

The products of the present invention may likewise be esterified with short chain acids such as acetic, propionic, butyric, lactic, glycollic, and the like, to produce plasticizers, or they may be esterified with long chain saturated acids such as stearic and the like to produce waxes. By partial esterification with long chain acids, it is possible to produce emulsifying agents.

The polyhydric alcohols themselves are useful as humectants in tobacco and other products which require the maintenance of a given moisture level and freshness. The polyhydric alcohols may also be used to plasticize glue or gelatin where a flexible glue or protein composition or film is required. They are also useful in cosmetics in combination with suitable emulsifying agents and mineral oil as a hand or face lotion. Other uses include use in rubber stamp inks, copying inks, and shoe polishes, where the polyhydric alcohols prevent excessive drying and serve as a solvent for the dye or coloring matter. They are also useful in dying and printing textiles as they improve the penetrating power of the dye. They are also useful in soap production.

Example 1

Glycerol (95%, 184 parts) was mixed with aqueous sodium hydroxide (50%, 176 parts) with external cooling. Thereafter, the mixture was heated to 90–95° C., and glycerol dichlorohydrin (129 parts) was added over a period of two and one-half hours with stirring. Thereafter, heating and stirring was continued for six hours more, after which the filtered reaction mixture was diluted to incipient cloudiness with acetone and was neutralized with hydrochloric acid. The reaction mixture was then filtered and the filtrate was evaporated under reduced pressure to yield a mixture of product and inorganic material from which the product was extracted with absolute methanol. The alcohol was then removed under reduced pressure to yield a thick syrup with a hydroxyl content of 39.2%.

Example 2

The procedure of the preceding example was followed employing 184 parts of 95% glycerol, 352 parts of 50% aqueous sodium hydroxide, and 258 parts of glycerol dichlorohydrin. The product was worked up as previously indicated to obtain a syrup with a hydroxyl content of 27.7%.

Example 3

The procedure of Example 1 was followed, employing 129 parts of 95% glycerol, 352 parts of 50% aqueous sodium hydroxide, and 258 parts of glycerol dichlorohydrin. The reaction mixture was worked up as indicated in Example 1, save that it was diluted with methyl alcohol, and the product was extracted finally with absolute methyl alcohol. There resulted a thick syrup with a hydroxyl content of 29.5%.

Example 4

Aqueous sodium hydroxide (50%, 352 parts) was heated to 90° C., after which glycerol dichlorohydrin (258 parts) was added with stirring at such a rate that the internal temperature did not at any time exceed 115° C. The addition was effected in two and one-half hours after which stirring and heating at 95° C. was continued for five hours. The reaction mixture was then diluted with methanol, neutralized with dilute hydrochloric acid and filtered, after which the filtrate was concentrated under reduced pressure. The resulting material was extracted with absolute methanol, after which the solvent was evaporated to obtain a syrup with a hydroxyl content of 28.5%.

Example 5

Pentaerythritol (272 parts) was mixed with aqueous sodium hydroxide (50%, 704 parts) after which the mixture was heated at 90° C. for thirty minutes. Glycerol dichlorohydrin (516 parts) was added with stirring over a period of four and one-half hours at a temperature which did not exceed 105° C. Thereafter, the reaction mixture was heated and stirred for one-half hour longer, after which the reaction mixture was diluted with methanol, neutralized with dilute hydrochloric acid and filtered. The filtrate was desolvated under reduced pressure and a product was obtained by methanol extraction. The resulting syrup had a hydroxyl content of 26.2%.

Example 6

The procedure of Example 5 was employed with 544 parts of pentaerythritol, 352 parts of 50% aqueous sodium hydroxide, and 258 parts of glycerol dichlorohydrin. The addition was completed at 105° C. in two and three-fourths hours, after which stirring and heating was continued for one and one-fourth hours more. The product was isolated as indicated previously and possessed a hydroxyl content of 28.1%.

Example 7

Diethanolamine (210 parts) was mixed with sodium hydroxide (50%, 528 parts) with external cooling, after which glycerol dichlorohydrin (387 parts) was added with stirring over a period of two hours. After addition the reaction mixture was stirred and heated at 82° C. for four hours. The product was isolated as indicated in previous examples and possessed a hydroxyl and imine content of 17.8%.

Example 8

Glycerol (95%, 288 parts) was mixed with aqueous sodium hydroxide (50%, 528 parts) with external cooling, after which there was added at 100° C. with stirring, 2-chloroethyl ether (429 parts) over a period of four and one-half hours. The reaction mixture was then stirred and heated at 105° C. for eight hours longer. Thereupon the reaction mixture was filtered and the organic layer, which was unreacted 2-chloroethyl ether, was separated. The aqueous layer was neutralized with dilute hydrochloric acid, after which it was filtered, and the filtrate was concentrated in vacuo to yield a mixture from which the product was extracted with absolute methanol. It possessed a hydroxyl content of 33.6%.

Example 9

Pentaerythritol (272 pardts) was mixed with aqueous sodium hydroxide (50%, 704 parts), after which 2-chloroethyl ether (572 parts) was added. The entire mixture was placed in an autoclave under 65 pounds of steam pressure and was allowed to stir for two hours, whereupon the pressure was raised to 95 pounds. This allowed an operating temperature of 150° C. to be reached. The pressure within the reaction vessel, which was initially one hundred pounds, dropped to about eighty pounds at the end of four hours, indicating that considerable reaction had resulted. After six hours the reaction mixture was removed from the vessel and was worked up, as indicated in previous examples, to yield a product with a hydroxyl content of 18.3%.

Example 10

The procedure of the preceding example was employed with 408 parts of pentaerythritol, 528 parts of 50% aqueous sodium hydroxide, and 429 parts of 2-chloroethyl ether. An initial reaction pressure of 160 pounds was employed, which fell at the end of six hours to 60 pounds. An average temperature of 150° C. was maintained throughout the reaction. The reaction mixture was worked up as indicated previously to obtain a compound with a hydroxyl content of 22.6%.

Example 11

A mixture of 270 parts by weight of paraformaldehyde, 1600 parts of water and 88 parts of acetaldehyde was treated with stirring with a portion of 54 parts of calcium oxide at a rate such that the temperature rose to 50° C. in one-half hour. Thereafter, the remainder of the calcium oxide was added over a period of one hour so that the temperature did not rise above 5° C. The mixture was stirred for three hours longer and then evaporated until approximately 800 parts of water had been removed. The exact amount of water removed is not important, and more or less concentrated solutions may be used. To this solution was added with external cooling 352 parts of flaked sodium hydroxide. The mixture was heated to 75° C. and the addition of 516 parts of glycerol dichlorohydrin was carried out with stirring over a period of four and one-half hours. The maximum temperature reached was 105° C. After addition, heating and stirring was continued until the total reaction time was six hours. The reaction mixture was diluted with methanol, filtered, neutralized with hydrochloric acid, and concentrated under vacuum. The product was extracted from the resulting mixture of product and inorganic material with methanol to yield a thick syrup with a hydroxyl content of 28.7%.

Example 12

The product of Example 1 was subjected to distillation under vacuum. The mixture was stirred to facilitate the process. There resulted 93 parts of glycerol which distilled at 150–160° C. at 1 mm. The undistillable residue was extracted with absolute methanol and the alcohol was removed to yield a thick syrup with a hydroxyl content of 25.7%. This product was quite light in color and had evidently undergone a sort of "heat bleaching" or else colored impurities had been removed by distillation.

The term non-distillable as herein described is intended to designate materials which are virtually non-volatile at vacuums as low as 0.5 mm.

While various modifications of the invention have been described, it is understood that the invention is not limited thereto, but may be varied within the scope of the following claims.

We claim as our invention:

1. Non-distillable cross-linked polymeric polyfunctional compounds selected from the group consisting of polyhydric alcohols and amino alcohols, said compounds resulting from the substantially complete reaction under alkaline conditions of a monomeric compound selected from the group consisting of polyhydroxy compounds and amino hydroxy compounds with an alkylating agent containing a plurality of alkylating groups, the total number of groups capable of entering the alkylation reaction being at least 5, and the molecular ratio of alkylating agent to other reactant being not substantially greater than about 2 to 1.

2. Non-distillable cross-linked polymeric polyhydric alcohols resulting from the substantially complete reaction under alkaline conditions of a monomeric polyhydroxy compound with an alkylating agent containing a plurality of alkylating groups, the total of alkylating groups and hydroxyl groups in the reactants being at least 5, and the molecular ratio of alkylating agent to polyhydroxy compound being not substantially greater than about 2 to 1.

3. Non-distillable cross-linked polymeric amino alcohols resulting from the substantially complete reaction under alkaline conditions of a monomeric amino hydroxy compound with an alkylating agent containing a plurality of alkylating groups, the total of alkylating groups, amino groups, and hydroxyl groups in the reactants being at least 5, and the molecular ratio of alkylating agent to amino hydroxy compound being not substantially greater than about 2 to 1.

4. Non-distillable cross-linked polymeric polyhydric alcohols resulting from the substantially complete reaction under alkaline conditions of a monomeric polyhydroxy compound with a polyhalohydrin of a polyhydric alcohol, the total of alkylating groups and hydroxyl groups in the reactants being at least 5, and the molecular ratio of polyhalohydrin to polyhydroxy compound being not substantially greater than about 2 to 1.

5. Non-distillable cross-linked polymeric amino alcohols resulting from the substantially complete reaction under alkaline conditions of a monomeric amino hydroxy compound with a polyhalohydrin of a polyhydric alcohol, the total of alkylating groups, amino groups, and hydroxyl groups in the reactants being at least 5, and the molecular ratio of alkylating agent to other reactant being not substantially greater than about 2 to 1.

6. Non-distillable cross-linked polymeric amino alcohols resulting from the substantially complete reaction under alkaline conditions of a monomeric alkanolamine with an alkylating agent containing a plurality of alkylating groups, the total of alkylating groups, amino groups, and hydroxyl groups in the reactants being at least 5, and the molecular ratio of alkylating agent to other reactant being not substantially greater than about 2 to 1.

7. Process of producing non-distillable cross-linked polymeric polyfunctional compounds which comprises reacting a monomeric compound selected from the group consisting of polyhydroxy compounds and amino hydroxy compounds with an alkylating agent containing a plurality of alkylating groups under alkaline conditions, the total of groups capable of entering the alkylation reaction being at least 5 and the molecular ratio of alkylating agent to other reactant being not substantially greater than about 2 to 1.

8. Process of producing non-distillable cross-linked polymeric polyfunctional compounds which comprises reacting a monomeric polyhydroxy compound with a polyhalohydrin of a polyhydric alcohol under alkaline conditions, the total of alkylating groups and hydroxyl groups in the reactants being at least 5 and the molecular ratio of polyhalohydrin to polyhydroxy compound being not substantially greater than about 2 to 1.

9. Process of producing non-distillable cross-linked polymeric polyfunctional compounds which comprises reacting a monomeric alkanolamine with an alkylating agent having a plurality of alkylating groups under alkaline condtions, the total of alkylating groups, amino groups and hydroxyl groups in the reactants being at least 5 and the molecular ratio of alkylating agent to alkanolamine being not substantially greater than about 2 to 1.

10. Process of producing non-distillable cross-linked polymeric polyhydric alcohols which comprises reacting glycerol dichlorhydrin with the alkaline condensation reaction mixture of formaldehyde and acetaldehyde, said reaction mixture containing a polyhydric alcohol, the molecular ratio of glycerol dichlorhydrin to polyhydric alcohol being not substantially greater than about 2 to 1.

11. Process of producing non-distillable cross-linked polymeric polyhydric alcohols which comprises reacting an alkylating agent having a plurality of alkylating groups with the alkaline condensation reaction mixture of a carbonyl-containing compound and formaldehyde, said reaction mixture containing a polyhydric alcohol, the molecular ratio of alkylating agent to polyhydric alcohol being not substantially greater than about 2 to 1.

12. Process of producing non-distillable cross-linked polymeric polyhydric alcohols which comprises reacting glycerol with glycerol dichlorhydrin under alkaline conditions, the molecular ratio of glycerol dichlorhydrin to glycerol being not substantially greater than about 2 to 1, subjecting the reaction mixture to vacuum distillation to remove unreacted glycerol, extracting the residue with a lower aliphatic alcohol, and removing the alcohol.

13. Non-distillable cross-linked polymeric polyhydric alcohols resulting from the substantially complete self-condensation of glycerol dichlorhydrin under alkaline conditions.

14. Non-distillable cross-linked polymeric polyhydric alcohols resulting from the substantially complete condensation of glycerol and glycerol dichlorhydrin under alkaline conditions, the molecular ratio of glycerol dichlorhydrin to glycerol being not substantially greater than about 2 to 1.

HAROLD WITTCOFF.
JOHN ROBERT ROACH.

REFERENCES CITED

The following references are of record in the file of this patent:

UNITED STATES PATENTS

| Number | Name | Date |
|---|---|---|
| 1,922,459 | Schmidt | Aug. 15, 1933 |
| 2,178,173 | Katzman et al. | Oct. 31, 1939 |
| 2,251,236 | Tyler | July 29, 1941 |
| 2,258,892 | Harris | Oct. 14, 1941 |
| 2,325,589 | Bried | Aug. 3, 1943 |
| 2,441,595 | Rapoport | May 18, 1948 |

OTHER REFERENCES

Contardi, "Chem. Ab." 33, 4583 (1939).
Nichols et al., J. Am. Chem. Soc. 67, page 46 (1945).
Nichols et al., J. Am. Chem. Soc. 68, page 2020 (1946).

---

Certificate of Correction

Patent No. 2,537,726　　　　　　　　　　　　　　　　January 9, 1951

HAROLD WITTCOFF ET AL.

It is hereby certified that error appears in the printed specification of the above numbered patent requiring correction as follows:

Column 6, line 62, for "pardts" read *parts*; column 7, line 25, for "5° C." read *55° C.*; column 9, line 4, for "condtions" read *conditions*; and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*